Figure 1:
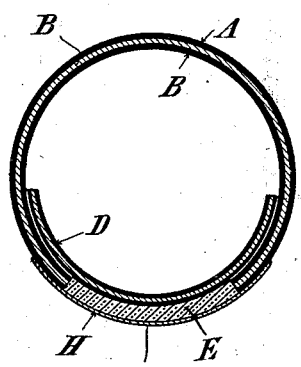

(No Model.)

A. STRAUS.
PNEUMATIC TIRE.

No. 548,675.   Patented Oct. 29, 1895.

Witnesses:
Raphael Netter
James R. Catlow

Alexander Straus Inventor
by Duncan & Page,
Attorneys.

UNITED STATES PATENT OFFICE.

ALEXANDER STRAUS, OF NEW YORK, N. Y.

PNEUMATIC TIRE.

SPECIFICATION forming part of Letters Patent No. 548,675, dated October 29, 1895.

Application filed June 21, 1895. Serial No. 553,521. (No model.)

*To all whom it may concern:*

Be it known that I, ALEXANDER STRAUS, a citizen of the United States, residing at New York, in the county and State of New York, have invented certain new and useful Improvements in Pneumatic Tires, of which the following is a specification, reference being had to the drawings accompanying and forming a part of the same.

The subject of my present application is an improvement in pneumatic tires for bicycles and other vehicles, the nature and purpose of which will be readily understood from a consideration of certain conditions which are met with in pneumatic tires as heretofore constructed and which operate very greatly to their disadvantage and interfere with their successful use.

Tires of the general type known as "hose-pipe" tires—that is to say, those which are composed of endless single tubes—are usually made up of a woven fabric coated interiorly and exteriorly with india-rubber. These tires in common with all forms of inflated tire are liable to be punctured by such articles as pins, tacks, thorns, and numberless other such things as are met with in the roads and streets through which the wheels are ridden. The puncture of a tire from such causes is almost invariably in the outer or tread portion of the tire, and in the tires of the type referred to it has been customary to patch such punctures by first enlarging the hole made by the foreign substances and then inserting a rubber plug of suitable character. Experience, however, has demonstrated that single-tube tires are not effectively repaired in this manner; but on the contrary it repeatedly happens that after a tire has been once punctured and repaired it fails thereafter to retain air under pressure for any considerable length of time. My investigations have led me to believe that the cause of this defect is to be found in the fact that when a sharp-pointed object has been forced through the tread of a tire, thereby puncturing the tire at that point, the injury inflicted by the object is not confined to the puncture so made, but that in a large number of cases and before the rider is aware of the fact the tire has collapsed sufficiently by the escape of air to permit the point of the object picked up and forced through the tire to puncture the inner rubber coating on the inside of the tire opposite to the point in the tread at which it entered. This leaves a passage, although it may be very minute, from the inner air-chamber of the tire to that portion of the wall of the tire composed of the woven fabric and which is not air-tight. The presence of such a passage it is practically impossible to detect; but it affords a vent for the compressed air through the fabric to any part of the tire, and as the outer cover or layer of the tire is generally porous the air soon finds a passage out and the tire becomes deflated and unsuitable for use.

The object of this invention is to construct a tire, whether of the specific form described above as the hose-pipe tire or any other in which similar conditions obtain, in which such action as above described is impossible. In other words, the invention involves a tire so constructed that the puncture of the inner rubber coating along that portion of the tire which lies next the rim will not admit the air from the interior of the tire to the fabric which extends around the tread portion of the tire, but will confine it to the interior chamber of the tire or prevent its escape by providing a non-porous wall to any passage or part of the tire to which the air may be admitted.

Figure 2:
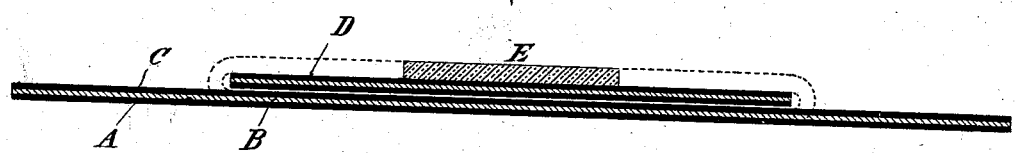

In carrying out this improvement in the best manner at present known to me I produce the tire illustrated in section in Figure 1 in the accompanying drawings by the process of manufacture illustrated by the enlarged sectional detail, Fig. 2.

I first prepare a strip of fabric A with the outer coating B and inner coating C of india-rubber, such as is commonly used in making up pneumatic tires of this kind, but slightly narrower than the similar strips used for the same purpose. The ends of this strip are joined in the usual manner or the strip is made endless and laid on a drum indicated in dotted lines in the figure. Over the central portion of the compound strip I then lay a narrower strip of fabric coated on both sides with pure rubber and indicated by the letter D. The surfaces of the strip D and the compound strip thus brought in contact are prevented from adhering by dusting them with soapstone. Over the central portion of the strip D, I next lay a comparatively thick strip of rubber E of less width than the strip D, and I then fold over the edges of the compound strip, as indicated in dotted lines in Fig. 2, until they abut against the edges of the rubber strip E and thus bring the inner surfaces of the edges of the compound strip into contact with the rubber-coated strip D. The rubber in the several strips is thus far unvulcanized or only partially vulcanized, and to secure better adhesion any proper solution or cement may be employed. The whole is then subjected to vulcanization and cured and a tire, such as is shown in Fig. 1, is produced, and in which the strip D, united with and reinforcing the rubber portion E, is united to the inner surfaces of the edges of the part A by the process of vulcanization. A strip of fabric H may also be cemented or vulcanized to the outer surface of the tire which lies in the rim for securing greater strength.

It will be observed that in this tire the outer or tread portion is the same in composition as the corresponding portion of the ordinary hose-pipe tire. The inner or rim portion differs, however, in being of rubber only, although it is preferably lined with the canvas strip D, which serves as a bridge to join the tire and at the same time, if rubber-coated, which it need not always be, to complete the air-tight wall of the chamber of the tire. Should the inner coating of the strip D or the strip and both coatings be punctured, there is still no escape for the air, since it cannot reach the fabric in the outer or tread portion which is entirely absent from the part of the tire lying opposite to the tread and next the rim, but it must either be confined between the rubber strip E and the coated strip D or else find its way back into the air-chamber between the coated strip D and the inner rubber wall of the compound or outer strip. It will readily be seen that this entirely obviates the objection to tires of this character which is above set forth.

What I claim as my invention is—

1. A tubular pneumatic tire in which the portion lying in the rim is of india rubber united to and reinforced by a strip of fabric which is united to the inner surface of the other or tread portion of the tire as set forth.

2. A pneumatic tire composed of a tube, the outer or tread portion of which is of rubber and fabric, and the inner portion of rubber and having an interior strip of rubber-coated fabric united thereto along the portion of the tire lying next the rim, as set forth.

3. A pneumatic tire composed of the tube formed by the compound strip, A, B, C, the rubber strip E and the bridging strip of rubber-coated fabric D united by vulcanization in the manner herein set forth.

4. A tubular pneumatic tire, the inner portion of which or that which lies within and adjacent to the rim, is composed of india rubber and strips of fabric coated interiorly and exteriorly with an air-tight layer of rubber and adhering to the inner surface of a compound strip of rubber and fabric constituting the tread portion, as set forth.

In testimony whereof I have hereunto set my hand this 14th day of June, 1895.

ALEXANDER STRAUS.

Witnesses:
ROBT. F. GAYLORD,
PARKER W. PAGE.